(12) United States Patent
Morath et al.

(10) Patent No.: US 9,938,988 B2
(45) Date of Patent: Apr. 10, 2018

(54) EXHAUST GAS TURBOCHARGER

(71) Applicant: ABB Turbo Systems AG, Baden (CH)

(72) Inventors: Christoph Morath, Ühlingen-Birkendorf (DE); Stefan Gantert, Lottstetten (DE)

(73) Assignee: ABB TURBO SYSTEMS AG, Baden (CH)

( * ) Notice: Subject to any disclaimer, the term of this patent is extended or adjusted under 35 U.S.C. 154(b) by 152 days.

(21) Appl. No.: 15/075,646

(22) Filed: Mar. 21, 2016

(65) Prior Publication Data
US 2016/0208821 A1 Jul. 21, 2016

Related U.S. Application Data

(63) Continuation of application No. PCT/EP2014/069750, filed on Sep. 17, 2014.

(30) Foreign Application Priority Data

Sep. 20, 2013 (DE) .................. 10 2013 015 563

(51) Int. Cl.
*F02B 33/44* (2006.01)
*F04B 17/00* (2006.01)
(Continued)

(52) U.S. Cl.
CPC .......... *F04D 29/626* (2013.01); *F01D 5/025* (2013.01); *F01D 5/06* (2013.01); *F02C 6/12* (2013.01);
(Continued)

(58) Field of Classification Search
CPC ...... F04D 29/626; F04D 29/284; F01D 5/025; F01D 5/06; F02C 6/12; F05D 2220/40; F05D 2230/60
(Continued)

(56) References Cited

U.S. PATENT DOCUMENTS 2,010,525 A * 8/1935 McHugh ................. F04D 29/20
415/206
4,705,463 A * 11/1987 Joco ....................... F04D 29/266
417/407
(Continued)

FOREIGN PATENT DOCUMENTS

CN          1212320 A        3/1999
DE    102008056058 A1 *  2/2010   ........... F04D 29/266
(Continued)

OTHER PUBLICATIONS

European Patent Office, International Search Report for PCT/EP2014/069750, dated Dec. 11, 2014, 5 pages (including English translation).
(Continued)

*Primary Examiner* — Thai Ba Trieu
(74) *Attorney, Agent, or Firm* — Barnes & Thornburg LLP

(57) ABSTRACT

An exhaust turbocharger comprises a turbine having a turbine wheel and a compressor having a compressor wheel. The turbine wheel and the compressor wheel are connected by a shaft rotatably mounted in a bearing housing. A means for axially securing the shaft and the turbine wheel connected thereto is provided between the compressor wheel and the turbine wheel. The means limits an axial movement of the shaft and of the turbine wheel connected thereto in the direction of the turbine in the event of the compressor wheel bursting. The means comprises a component which is screwed onto the shaft during mounting and is fixed in the axial direction in the housing.

7 Claims, 2 Drawing Sheets

(51) Int. Cl.
    *F04D 29/08*     (2006.01)
    *F04D 29/04*     (2006.01)
    *F04D 29/62*     (2006.01)
    *F01D 5/02*     (2006.01)
    *F02C 6/12*     (2006.01)
    *F01D 5/06*     (2006.01)
    *F04D 29/28*     (2006.01)

(52) U.S. Cl.
    CPC ........ *F04D 29/284* (2013.01); *F05D 2220/40* (2013.01); *F05D 2230/60* (2013.01)

(58) Field of Classification Search
    USPC ............. 60/605.1; 415/111, 200, 206, 216.1; 417/407
    See application file for complete search history.

(56) References Cited

U.S. PATENT DOCUMENTS

| | | | | |
|---|---|---|---|---|
| 5,046,920 | A * | 9/1991 | Higashi | F03B 11/06 |
| | | | | 415/111 |
| 5,176,497 | A * | 1/1993 | Deacon | F04D 29/266 |
| | | | | 415/200 |
| 6,918,723 | B2 * | 7/2005 | Battig | F01D 5/025 |
| | | | | 403/299 |
| 7,374,402 | B2 * | 5/2008 | Thiele | F04D 29/266 |
| | | | | 416/204 A |
| 2001/0036403 | A1 | 11/2001 | Heyes | |
| 2005/0175477 | A1 * | 8/2005 | Kopp | F04D 29/266 |
| | | | | 417/407 |
| 2007/0122296 | A1 | 5/2007 | Arnold et al. | |
| 2008/0098735 | A1 | 5/2008 | Gutknecht | |
| 2010/0209266 | A1 * | 8/2010 | Ikeda | F04B 35/04 |
| | | | | 417/410.1 |
| 2013/0330193 | A1 * | 12/2013 | Asano | F04D 29/266 |
| | | | | 416/169 R |
| 2014/0369840 | A1 * | 12/2014 | Pinkney | F04D 29/266 |
| | | | | 416/204 A |
| 2015/0093247 | A1 * | 4/2015 | Asano | F04D 29/266 |
| | | | | 416/204 R |
| 2016/0377089 | A1 * | 12/2016 | Boening | F04D 29/266 |
| | | | | 415/216.1 |

FOREIGN PATENT DOCUMENTS

| | | | | |
|---|---|---|---|---|
| DE | 102008056059 A1 * | 2/2010 | .......... | F04D 29/266 |
| DE | 102009007945 A1 * | 8/2010 | .......... | F04D 29/266 |
| DE | 102013213023 A1 * | 1/2015 | .......... | F04D 29/266 |
| EP | 1130220 A2 | 9/2001 | | |
| EP | 1353041 A1 * | 10/2003 | .......... | F04D 29/266 |
| GB | 2498400 A | 7/2013 | | |
| JP | 11062600 A * | 3/1999 | | |

OTHER PUBLICATIONS

European Patent Office, Written Opinion of the International Searching Authority for PCT/EP2014/069750, dated Dec. 11, 2014, 14 pages (includingEnglish translation).

European Patent Office, International Preliminary Report on Patentability for PCT/EP2014/069750, dated Mar. 22, 2016, 7 pages.

* cited by examiner

EXHAUST GAS TURBOCHARGER

CROSS-REFERENCE TO RELATED APPLICATIONS

This application is a continuation of International Application Serial No. PCT/EP2014/069750, filed Sep. 17, 2014, which claims priority to German Patent Application No. 102013015563.0, filed Sep. 20, 2013. The entire disclosures of both of the foregoing applications are hereby incorporated by reference.

TECHNICAL FIELD

The invention relates to the field of exhaust turbochargers for pressure-charged combustion engines.

It relates to an exhaust turbocharger having a turbine wheel and a compressor wheel, which are connected to one another by means of a shaft, wherein a means for axially securing the shaft and the turbine wheel connected thereto in the event of the compressor wheel bursting is provided between the compressor wheel and the turbine wheel.

PRIOR ART

Nowadays, it is standard practice to boost the power of a combustion engine (internal combustion engine) by using exhaust turbochargers which have a compressor that supplies air for the combustion process to the combustion chamber of the combustion engine and have an exhaust turbine in the exhaust tract of the combustion engine. Pressure-charging the combustion engine increases the volume of air and fuel in the combustion chambers (cylinders) and, as a result, a significant increase in the power of the combustion engine is obtained. The exhaust turbocharger used for this purpose normally consists of a rotor, comprising a compressor wheel and a turbine wheel as well as the shaft bearings, the housing parts through which the gas flows (compressor housing, turbine housing) and the bearing housing.

In full-load operation of the combustion engine, very high peripheral speeds are achieved at the tip diameters of the turbine and compressor wheels in the exhaust turbocharger. The maximum permissible rotor speed of an exhaust turbocharger depends on wheel size, geometry and the strength values of the materials used. In general, the rotating components are subject to very high circumferential forces and thus to high material stresses. In some circumstances, defects in the structure of the material may lead to the compressor or turbine wheel bursting, sometimes with serious consequences for the housing parts surrounding the rotating components. Fundamentally, the containment concept of an exhaust turbocharger must be designed with a view to ensuring that all the fragments are retained within the external housing and do not pose a risk to the surroundings of the charger.

In the case of a compressor wheel breakdown due to the compressor wheel breaking apart, there is a loss of braking torque on the turbocharger rotor, as a result of which the now freely rotating turbine accelerates to overspeed and, when it reaches the speed at which it naturally bursts, fails. In the case of natural bursting of a radial turbine, a distinction is drawn between two types of bursting.

In the case of hub bursting, the entire hub body, including the turbine blades, breaks up into a number of fragments, and the entire rotational energy of the turbine is instantaneously released. The fragments, which are thrown outward with a high momentum, cause considerable damage to the surrounding housing parts and, in the worst case, may even penetrate them and thereby pose a risk to the surroundings of the turbocharger.

On the other hand, the turbine can be designed in such a way that it fails due to bursting of the blades. In this scenario, the turbine blades fail in the region of the root adjoining the hub body, while the wheel hub of the turbine wheel remains intact, continues to rotate and is decelerated only by friction on the surrounding housing parts. Since, in the case of the bursting of the blades, all that occurs in the first instant is that the turbine blades are detached from the wheel hub, it is initially only the kinetic energy accounted for by the blades which is released to the surroundings. As the turbine runs down, the remaining rotational energy, i.e. that of the hub, is released to the housings by the friction mentioned.

When the blades of a radial turbine burst at the natural bursting speed thereof, there is generally the difficulty that there remains residual energy in the non-bursting hub body after the shedding of the blades. It is important here that the shaft is secured in the axial direction and cannot escape from the turbocharger housing in the axial direction and enter the gas outlet line. A freely rotating component in the gas outlet lines of the turbine is unwanted because it cannot be controlled and may cause damage to the exhaust lines.

EP 1353 041 A1 discloses an exhaust turbocharger in which there is arranged on the shaft connected to the turbine wheel a means for axially securing the shaft and the turbine wheel connected thereto. In the event of the compressor wheel bursting, the securing means prevents an axial movement of the shaft and of the turbine wheel connected thereto in the direction of the turbine. The securing means is, for example, a snap ring, which is arranged in a groove in the shaft and, together with housing parts, forms an axial stop for the shaft when installed.

However, additional parts for axially securing the shaft and the turbine wheel connected thereto entail increased assembly work. In the case of the snap ring, this is furthermore very difficult to automate and must be carried out manually.

DE 10 2008 056 058 A1 and DE 10 2008 056 059 A1 disclose joints involving compressor wheels on turbocharger shafts, in which a component screwed onto the shaft is in each case provided between the compressor wheel and the shaft, the component making it possible to prevent the shaft with the turbine-wheel hub body attached to it from escaping in the direction of the turbine in the event of a compressor wheel failure. In the mounted state, the component is connected to the shaft by means of a thread and clamped to the shaft by means of an axial stop.

BRIEF DESCRIPTION OF THE INVENTION

It is the underlying object of the invention to provide the shaft of the exhaust turbocharger with a securing device which, in the event of a compressor wheel failure, can prevent the shaft with the turbine-wheel hub body fixed thereon escaping in the direction of the turbine, and with which the shaft and the turbine wheel can be installed and removed in a simple manner.

The exhaust turbocharger comprises a turbine having a turbine wheel and a compressor having a compressor wheel. The turbine wheel and the compressor wheel are connected to one another by means of a shaft rotatably mounted in a bearing housing. The bearings are preferably arranged between the turbine wheel and the compressor wheel. A means for axially securing the shaft and the turbine wheel connected thereto is provided between the compressor wheel and the turbine wheel, wherein this means for axial securing limits or prevents an axial movement of the shaft and of the turbine wheel connected thereto in the direction of the turbine in the event of the compressor wheel bursting.

According to the invention, the means for axially securing the shaft and the turbine wheel connected thereto comprises a component which is connected to the shaft or mounted on the shaft and is limited in its freedom of movement toward the turbine side in the axial direction by an axial stop on the housing. According to the invention, this component for axially securing is screwed onto the shaft during mounting. For this purpose, the component is provided with an internal thread. Matching this, the shaft has a corresponding external thread, which enables the component to be screwed onto the shaft. In this arrangement, the smallest inside diameter of the internal thread of the component is smaller than the largest outside diameter of the external thread of the shaft.

According to the invention, the external thread on the shaft has an undercut at the turbine end, allowing the component to be screwed on beyond the external thread in the axial direction when being mounted on the shaft, until it is in an unthreaded undercut in the mounted state. The component is then clamped on the shaft between the compressor wheel and an axial stop on the shaft by screwing the compressor wheel onto the external thread. Jamming in the region of the thread when clamping between the compressor wheel and the axial stop is thereby prevented in the mounted state. If the compressor wheel is released from the thread in the case of bursting, however, the threads on the component in combination with the threads on the shaft together with the bearing housing parts prevent an axial movement of the shaft and of the turbine wheel connected thereto in the direction of the turbine.

As an option, the component used to axially secure the shaft and the turbine wheel connected thereto can be a sealing ring. This has the advantage that no further parts are required for axially securing the shaft and the turbine wheel connected thereto, and it is thus possible to reduce the assembly work or increase automation.

Further advantages will become apparent from the dependent claims.

BRIEF DESCRIPTION OF THE DRAWINGS

The sealing disk according to the invention and the associated embodiment of the shaft for an exhaust turbocharger are described below and explained in detail by means of illustrative drawings. Elements with the same action are provided with the same reference signs in the various figures. In the drawing.

EMBODIMENTS OF THE INVENTION

Figure 1:
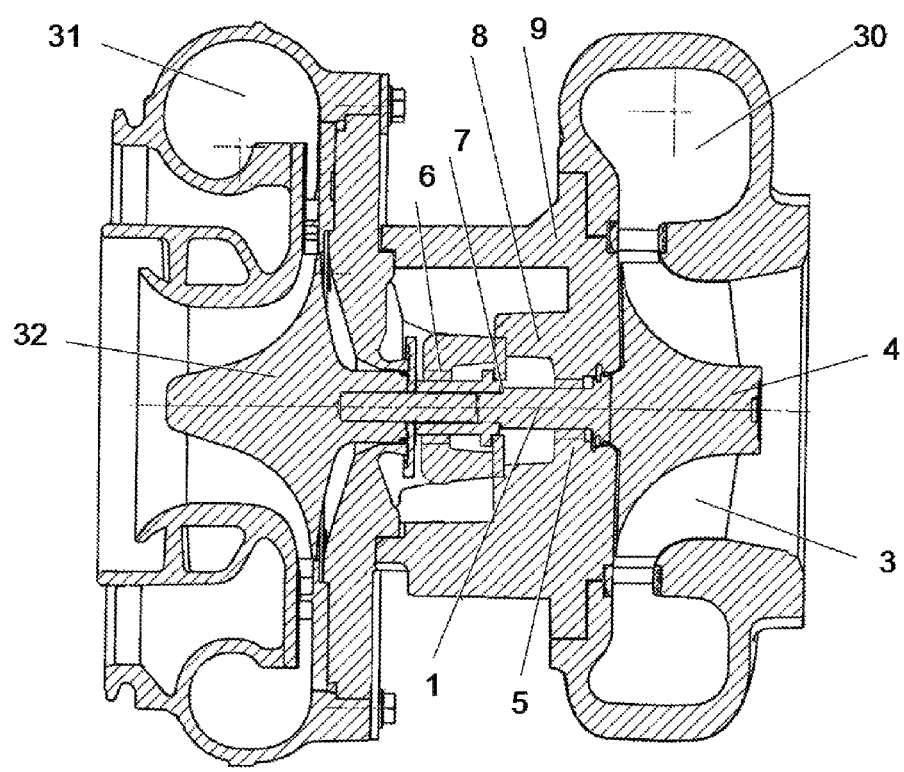
FIG. 1 shows a schematic longitudinal section through an exhaust turbocharger according to the prior art, having a shaft rotatably mounted in a housing and a turbine wheel connected to the shaft, and having a compressor wheel mounted on the shaft.

FIG. 1 shows an exhaust turbocharger according to the prior art, having a radial compressor and a radial turbine.

The radial turbine comprises a turbine wheel having a hub body 4 and rotor blades 3 fixed thereon. The turbine wheel is fixed on or embodied integrally with the shaft 1, which is mounted rotatably in radial bearings 5 and 6 in the bearing housing 9. The turbine housing 30 surrounds the turbine wheel and delimits the flow passages which carry the hot exhaust gas from the combustion engine to the exhaust systems via the turbine wheel. The radial compressor comprises a compressor wheel 32, which is likewise fixed on the shaft 1. The compressor housing 31 delimits the flow passages on the compressor side and generally consists of a plurality of housing parts.

A first and second embodiment of a means according to the invention for axially securing the shaft 1 and the turbine wheel connected thereto for a turbine-side bursting concept of an exhaust turbocharger in the case of blade bursting comprises the device shown in FIGS. 2 and 3 and explained below.

The means according to the invention for axially securing the shaft 1 and the turbine wheel connected thereto comprises a component 2 having an internal thread 131, and an external thread 132 formed on the shaft 1. The component 2 is mounted on the shaft, the internal thread 131 of the component 2 and the external thread 132 on the shaft 1 thus jointly forming a screwed joint 13, wherein the smallest inside diameter of the internal thread 131 of the component 2 is smaller than the largest outside diameter of the external thread 132 of the shaft 1. During mounting, the component 2 can thus be screwed onto the shaft 1. In the mounted state, the component 2 serves as an axial securing element, wherein an axial stop on the bearing housing 9 limits a movement of the shaft 1 in the axial direction. The axial stop can be either direct, that is to say that the component 2 rests directly on the bearing housing 9 in the case of bursting, or indirect, that is to say that further elements, e.g. a thrust collar 11, are situated between the component 2 and the bearing housing 9, and the component 2 thus rests only indirectly on the bearing housing 9 in the case of bursting.

The component used for axially securing according to the invention can be a sealing disk 2, which performs the function of the axial securing element through its positioning and fixing in the axial direction by the bearing housing 9. Here, the sealing disk 2 is preferably manufactured from a hard material, e.g. steel, in order to be able to absorb the occurring axial forces in the case of breakage of the compressor wheel without restriction of the retaining function.

Figure 2:
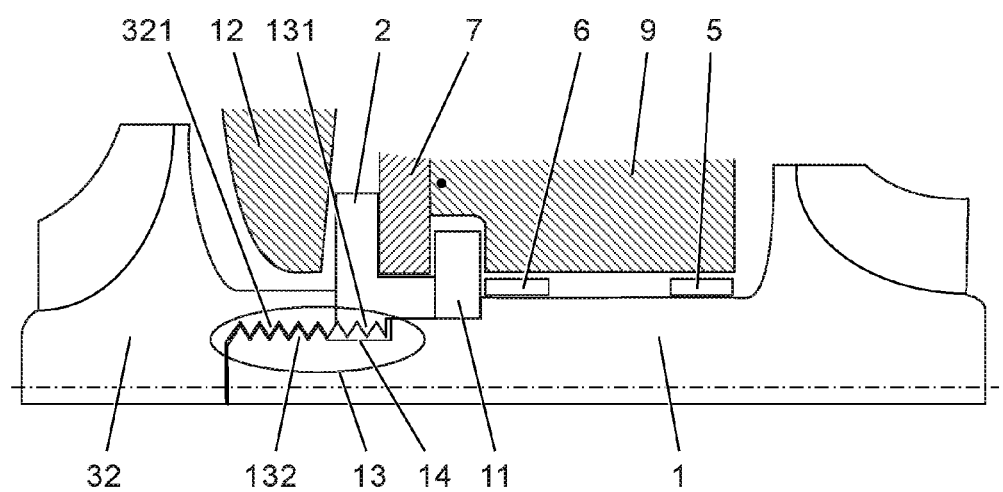
FIG. 2 shows a side view of an illustrative embodiment of the means according to the invention for axially securing the shaft and the turbine wheel connected thereto, having a sealing disk which is provided with a thread and which is installed in an undercut in the mounted state.

An illustrative embodiment of the invention is depicted in FIG. 2. According to the invention, this consists of a sealing disk 2 having an internal thread 131 and of an external thread 132 formed on the shaft 1. In the illustrative embodiment, the external thread 132 formed on the shaft 1 has a reduced length in the axial direction of the shaft 1 compared with the first embodiment, as a result of which an unthreaded undercut 14 is formed at the turbine end of the external thread 132, the undercut having, according to the invention, a length in the axial direction that at least corresponds to the thickness of the sealing disk 2. In the mounted state, the internal thread 131 of the sealing disk 2 is situated in the undercut 14, thereby excluding unwanted jamming of the sealing disk 2 in the thread. During mounting, the shaft 1 is in turn screwed through the sealing disk 2 from the turbine side (from the right in FIG. 2) toward the compressor side (to the left) until the thread of the sealing disk 2 is situated completely in the undercut 14. After the mounting of the compressor wheel 32, the sealing disk 2 is clamped in a compressed assembly between the compressor wheel 32 and an axial stop on the shaft, thereby ensuring that the sealing disk 2 is firmly connected to the shaft 1 in the operating state.

As an option, further components, such as a thrust collar 11, can be arranged in this clamped assembly. In the bearing housing 9, the sealing disk 2 is arranged between the bearing cover 12 and the axial bearing 7, which is connected firmly to the bearing housing. The sealing disk 2 rests against the axial bearing 7 in order to limit the axial movement of the shaft in the direction of the turbine. Limitation of the axial movement can also be accomplished by means of other components. For example, the shaft 1 can be secured axially by means of the sealing disk 2 and contact between a thrust collar 11 and the bearing housing 9.

LIST OF REFERENCE SIGNS

1 turbocharger shaft
2 component/sealing disk
3 rotor blades of the turbine wheel
4 hub body of the turbine wheel
5 radial bearing on the turbine side
6 radial bearing on the compressor side
7 axial bearing
8 flange of the bearing housing
9 bearing housing
11 thrust collar
12 bearing cover
13 screwed joint
131 internal thread on the component
132 external thread on the shaft
14 undercut
30 turbine housing
31 compressor housing
32 compressor wheel
321 internal thread on the compressor wheel

The invention claimed is:

1. An exhaust turbocharger comprising a turbine having a turbine wheel and a compressor having a compressor wheel, wherein the turbine wheel and the compressor wheel are connected to one another by a shaft rotatably mounted in a bearing housing, and means for axially securing the shaft and the turbine wheel connected thereto, the means being provided between the compressor wheel and the turbine wheel, wherein the means limits an axial movement of the shaft and of the turbine wheel connected thereto in the direction of the turbine in the event of the compressor wheel bursting, wherein the means comprises a component which is mounted on the shaft and which is provided with an internal thread, an external thread formed on the shaft, and an axial stop on the bearing housing, wherein the internal thread of the component forms a screwed joint with the external thread formed on the shaft when the component is mounted on the shaft, wherein the axial stop on the bearing housing limits the axial movement of the component and thus the axial movement of the shaft in the direction of the turbine in the event of the compressor wheel bursting, wherein the external thread formed on the shaft has an undercut at a turbine end of the external thread, and wherein the internal thread of the component is situated in the undercut at the turbine end of the external thread when the component is mounted on the shaft.

2. The exhaust turbocharger as claimed in claim 1, wherein the screwed joint comprises multi-start threads.

3. The exhaust turbocharger as claimed in claim 2, wherein the component is a sealing ring.

4. The exhaust turbocharger as claimed in claim 2, wherein the shaft has an external thread for screwing on the compressor wheel, and the external thread, formed on the shaft, for screwing on the component is the same external thread which is also used to fasten the compressor wheel.

5. The exhaust turbocharger as claimed in claim 1, wherein the component is a sealing ring.

6. The exhaust turbocharger as claimed in claim 5, wherein the shaft has an external thread for screwing on the compressor wheel, and the external thread, formed on the shaft, for screwing on the component is the same external thread which is also used to fasten the compressor wheel.

7. The exhaust turbocharger as claimed in claim 1, wherein the shaft has an external thread for screwing on the compressor wheel, and the external thread, formed on the shaft, for screwing on the component is the same external thread which is also used to fasten the compressor wheel.

* * * * *